Figure 1:
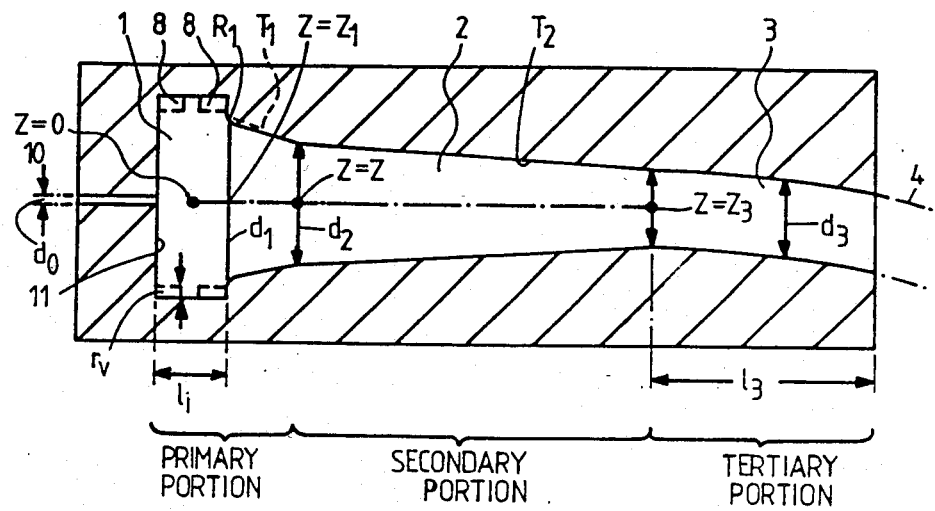

United States Patent [19]

Colman et al.

[11] Patent Number: 4,793,924
[45] Date of Patent: Dec. 27, 1988

[54] CYCLONE SEPARATOR

[75] Inventors: Derek A. Colman, Fleet; Martin T. Thew, South Hampton, both of United Kingdom

[73] Assignee: B.W.N. Vortoil Rights Co. Pty. Ltd., Dandenong, Australia

[21] Appl. No.: 44,362
[22] PCT Filed: Jun. 17, 1986
[86] PCT No.: PCT/AU86/00173
§ 371 Date: Feb. 27, 1987
§ 102(e) Date: Feb. 27, 1987
[87] PCT Pub. No.: WO86/07548
PCT Pub. Date: Dec. 31, 1986

[30] Foreign Application Priority Data

Jun. 17, 1985 [GB] United Kingdom ............... 8515264

[51] Int. Cl.$^4$ ..................... B01D 29/00; B01D 37/00
[52] U.S. Cl. .................. 210/512.1; 209/144; 209/211
[58] Field of Search ............... 210/788, 512.1; 209/144, 211

[56] References Cited

U.S. PATENT DOCUMENTS 4,576,724 3/1986 Colman et al. ............ 210/512.1

FOREIGN PATENT DOCUMENTS 8119565 6/1981 United Kingdom .

Primary Examiner—Frank Sever
Attorney, Agent, or Firm—Ladas & Parry

[57] ABSTRACT

This invention is about a cyclone separator. This separator may find application in removing a lighter phase from a large volume of a denser phase such as oil from water, with minimum contamination of the more voluminous phase. Most conventional cyclone separators are designed for the opposite purpose, that is removing a denser phase from a large volume of lighter phase, with minimum contamination of the less voluminous phase. In our case, a typical starting liquid-liquid dispersion would contain under 1% by volume of the lighter (less dense) phase, but it could be more.

17 Claims, 1 Drawing Sheet

CYCLONE SEPARATOR

According to the present invention there is provided a cyclone separator comprising at least a primary portion having generally the form of a volume of revolution and having a first end and a second end, the diameter at said second end being less than at said first end, a plurality of n inlets, where $n>1$, each said inlet having at least a tangential component at or adjacent said first end for introducing feed to be separated into the cyclone separator and the separator further including at least two outlets, in which cyclone separator the following relationship applies:

where $d_1$ is the diameter of the said primary portion where flow enters (but neglecting any feed channel $d_{ix}$ is twice the radius at which flow enters the cyclone through the $x^{th}$ inlet (i.e. twice the minimum distance of the tangential component of the inlet centre line from the axes) and $$d_i = \frac{1}{A_i} \sum_{x=1}^{x=n} d_{ix} A_{ix}$$

where $A_{ix}$ is the total cross sectional area of the $x^{th}$ inlet at entry to the cyclone separator in a plane parallel to the axis of the cyclone separator and perpendicular to the component of the inlet centre line not parallel to the cyclone axis, and where $$A_i = \sum_{x=1}^{x=n} A_{ix}$$

and where $d_2$ is the diameter of the primary portion at said second end and is measured at a point $z_2$ where the condition first applies that $$\tan^{-1}\left(\frac{d_2 - d}{2(z - z_2)}\right) < 2°$$

for all $z > z_2$ where z is the distance along the cyclnne separator axis downstream of the plane containing the inlet and d is the diameter of the cyclone at z, and further $z=0$ being the axial position of the weighted areas of the inlets' such that the injection of angular momentum into the cyclone separator is equally distributed axially about said axial position where $z=0$ and being defined by $$\frac{1}{A_i d_i} \sum_{x=1}^{x=n} z_x A_{ix} d_{ix} = 0$$

where $z_x$ is the axial position of the $x^{th}$ inlet, and further $$\frac{\pi d_2 d_i}{4 A_i}$$

is from 3 to 12

In one form the separator may be characterized in that where the plurality of inlets are not axially staggrred and/or do not include feed channels which are inwardly spiralling at least part of the generator of the primary portion is curved.

In one form the cyclone separator may have an inlet portion having generally the form of a volume of revolution with n inlets where $n>1$ (each inlet preferably tangential, and preferably with an inwards spiralling feed channel such as an involute entry) for introducing feed to be separated into the cyclone separator and, adjacent to the inlet portion and substantially coaxial therewith, a generally axially symmetrical separation portion converging (preferably uninterruptedly) into a downstream portion. Where the feed channels do not spiral inwards, or where they are not axially staggered, at least part of the generator of the inlet portion and/or of the separation portion is curved. The inlet portion may have an axial overflow outlet opposite the separation portion (i.e. in its end surface). In the cyclone separator, the following relationships (i)–(v) may apply: where $d_1$ is the diameter of the cyclone in the inlet portion where flow enters (but neglecting any feed channel), $d_i$ is twice the radius at which flow enters the cyclone through the $x^{th}$ inlet (i.e. twice the minimum distance of the tangential component of inlet centreline from the axis, and $$d_i = \frac{1}{A_i} \sum_{x=1}^{x=n} d_{ix} A_{ix}$$

$A_{ix}$ is the total cross-sectional area of the $x^{th}$ inlet measured at entry to the cyclone in a plane parallel to the axis of the cyclone and perpendicular to the component of the inlet centreline not parallel to the cyclone axis, $$A_i = \sum_{x=1}^{n} A_{ix},$$

$d_2$ is the diameter of the cyclone where the inlet portion joins the separation portion the point of junction being defined as being at the axial position $z_2$ (measured away from the inlet plane where $z=0$) where the condition first applies that:

$$\tan^{-1}\left(\frac{d_2 - d}{2(z - z_2)}\right) < 2° \text{ for all } z > z_2$$

where d is the cyclone diameter at z, $z=0$ being the axial position of the weighted areas of the inlets such that the injection of angular momentum into the cyclone is equally distributed axially about it and being defined by $$\frac{1}{A_i d_i} \sum_{x=1}^{x=n} Z_x A_{ix} d_{ix} = 0$$

where $Z_x$ is the axial position of the $x^{th}$ inlet, $d_3$ is the cyclone diameter where the separation portion joins the downstream section and is defined as the diameter at $z_3$ where $d/d_3 > 0.98$ for all $z > z_3$, $d_0$ is the minimum internal diameter of the axial overflow outlet, then:

$$3 \leq \frac{\pi d_2 d_i}{4 A_i} \leq 12$$

$$20' < \alpha < 2° \qquad \text{(ii)}$$

where $\alpha$ is the half angle of the convergence of the separation portion i.e.

$$\alpha = \tan^{-1}\left(\frac{d_2 - d_3}{2(z_3 - z_2)}\right)$$

$$d_0/d_2 < 0.2 \quad \text{(iii)}$$

$$0.9 d_1 > d_2 \quad \text{(iv)}$$

$$0.9 d_2 > d_3 \quad \text{(v)}$$

Each feed channel may be fed from a duct directed substantially tangentially into the inlet portion, the (outer) surface of the channel converging to the principal diameter of the inlet portion $d_1$, for example by substantially equal radial decrements per unit angle around the axis, preferably attaining the diameter $D_1$ after more than 360°/n around the axis.

The expression $$\frac{\pi d_2 d_1}{4A_1},$$

which we call the "swirl coefficient" S, is a reasonable predictor of the ratio of velocities tangentially: axially of flow which has entered the cyclone and which has reached the plane of $d_2$ and, (with a dispersed lighter phase, as is of interest to us) in order to be able to create an internal flow structure favourable for separation at a low split ratio $$\text{i.e. split ratio} = \frac{\text{(flow through axial overflow outlet)}}{\text{(total flow through inlets)}}$$

of the order of 1%, then the half-angle of convergence averaged over the whole separation portion is 20' to 2°, preferably less than 1°, more preferably less than 52', preferably at least 30'. S is from 3 to 12, preferably from 2 to 10, more preferably from 6 to 8. The convergence averaged from the diameter $d_1$ measured in the inlet plane to the diameter $d_2$ may be the fastest (largest cone half-angle) in the cyclone, and may be from 5° to 45°. (The inlet plane is that plane normal to the cyclone axis including the point z=0.) The inlet portion should be such that the angular momentum of material entering from the inlets is substantially conserved into the separation portion.

Preferably, $d_3/D_2$ is less than 0.75 (more preferably less than 0.7) and preferably exceeds 0.25 (more preferably exceeding 0.3). Preferably where the internal length of the downstream outlet portion is $l_3$, $l_3/d_3$ is at least 1, more preferably at least 5; is typically about 10 and may be as large as desired, such as at least 40. For space reasons it may be desired to curve the dense-phase-outlet portion gently, and a radius of curvature of the order of 50 $d_3$ is possible, and gentle curvature of the cyclone axis is feasible, $d_1/d_2$ may be from 1¼ to 3. Preferably $d_0/d_2$ is at most 0.15 and preferably at least 0.008, possibly from 0.01 to 0.1, such as 0.02 to 0.06. Pressure drop in the axial overflow outlet should not be excessive, and therefore the length of the "$d_0$" portion of the axial overflow outlet should be kept low. The axial overflow outlet may reach its "$d_0$" diameter instantaneously or by any form of abrupt or smooth transition, and may widen thereafter by a taper or step. The axial distance from the inlet plane to the "$d_0$" point is preferably less than $4d_2$. The actual magnitude of $d_2$ is a matter of choice for operating and engineering convenience and may for example be 10 to 100 mm.

In another form, according to the invention, at least part of the generator of the inlet portion or of the separation portion or of both is curved. This is compulsory according to the invention unless the inlets comprise inwards spiralling feed channels or unless the inlets comprise inwards spiralling feed channels or unless the inlets are axially staggered. The generator may be, for example, (i) a monotonic curve (having no points of inflexion) steepest at the inlet-portion end and tending to a cone-angle of zero at its open end, or (ii) a curve with one or more points of inflexion but overall converging towards the downstream outlet portion, preferably never diverging towards the downstream outlet portion. Where the inlets comprise inwards spiralling feed channels, the generator of the inlet and/or separation portions may be straight.

The invention extends to a method of removing a lighter phase from a larger volume of denser phase, comprising applying the phases to the feed of a cyclone separator as set forth above, the phases being at a higher pressure than in the axial overflow outlet and in the downstream end of the downstream outlet portion; in practice, it will generally be found that the pressure out of the downstream outlet portion will exceed that out of the axial overflow outlet.

This method is particularly envisaged for removing up to 1 part by volume of oil (light phase) from over 19 parts of water (denser phase), such as over 99 parts), such as oil-field production water or sea water which may have become contaminated with oil, as a result of a spillage, shipwreck, oil-rig blow out or routing operations such as bilge-rinsing or oil-rig drilling. The ratio of flow rates upstream outlet/downstream outlet (and hence the split ratio) has a minimum value for successful separation of the oil, which value is determined by the geometry of the cyclone (especially by the value of $d_o/d_2$) but preferably the cyclone is operated *above* this minimum value, e.g. by back pressure for example provided by valving or flow restriction outside the defined cyclone. Thus preferably the method comprises arranging the split ratio to exceed 1¼ $(d_o/d_2)^2$, preferably to exceed $2(d_o/d_2)^2$.

The method preferably further comprises, as a preliminary step, eliminating free gas from the phases such that in the inlet material the volume of any gas is not more than 10%, such as not more than ½%.

As liquids normally become less viscous when warm, water for example being approximately half as viscous at 50° C. as at 20° C., the method is ddvantageously performed at as high a temperature as convenient. The invention extends to the products of the method (such as concentrated oil, or cleaned water).

Figure 2:
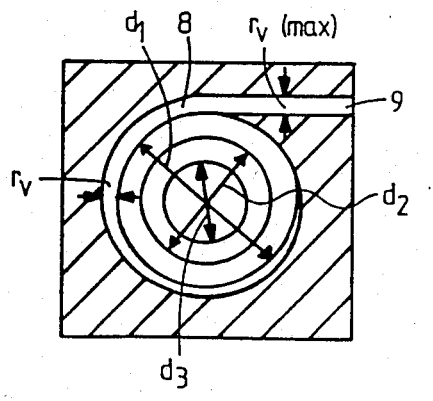

The invention will now be described by way of example with reference to the accompanying drawings, in which:

FIG. 1 shows, schematically, a cross-section taken on the axis of a cyclone separator according to the invention, and FIG. 2 is a view down the axis of the cyclone separator. The drawings are not to scale.

An inlet portion 1 having generally the shape of a volume of revolution has two spiral feed channels each fed from a duct 9 directed tangentially into the widest part of the inlet portion 1, the two being symmetrically disposed about the cyclone axis. The width (radially) of the duct 9 is $r_v$ (max), and the channel 8 converges smoothly to the principal diameter $d_1$ of the inlet portion; thus $r_v$ diminishes linearly to zero at about 180° after the point of entry of the duct 9 into the cyclone separator. This is best seen in FIG. 2, which is a view down the axis of the cyclone separator, whose end surface 11 has been removed. Coaxial with the inlet portion 1, and adjacent to it, is a separation cylindrical downstream outlet portion 3. The portion 3 opens into collection ducting 4. The channel 8 alternatively may be slightly angled towards the separation portion 2 to impart an axial component of velocity, and in that case may be helical, reducing to the principal diameter $d_1$ after say 2 full revolutions.

The inlet portion 1 has an axial overflow outlet 10 opposite the separation portion 2.

In the present cyclone separator, the actual relationships are as follows:

$$d_1/d_2 = 1.5$$

The half-angle of conicity of the separation portion 2 =40' ($T_2$ on Figure).

The average half-angle of conicity of the inlet portion 1=10° ($T_1$ on Figure).

Where the axial extent of the duct 9 is $l_il_i/d_1 = \frac{1}{2}$ (more precisely 30/57).

$$l_3/d_3 = 40.$$

$$d_o/d_2 = 0.04.$$

This cyclone should accordingly be operated at a split ratio $$\left( \frac{\text{flow rate through upstream outlet}}{\text{flow rate through inlet}} = \text{split ratio} \right)$$

of more than $1\frac{1}{2} (0.04)^2$ i.e more than 0.24%.

To the principal diameter $d_1$ of the inlet portion, there must be added a radial amount $r_v$ decreasing smoothly from 4.4 mm (maximum) to zero, for the volute inlets, n being 2:

$$\frac{\pi d_2 (d_1 + r_v (\max))}{4n l_i r_v (\max)} = 7,$$

noting that $nl_i r_v (\max) = A_i$ as defined previously and $(d_1 + r_v(\max)) = d_i$ as defined previously, the foregoing expression thus being the swirl coefficient S of this cyclone. The taper which averages out as $T_1$ actually curves over a radiussing $R_1$ (radius=5 mm) into a frustoconical part of the inlet portion 1.

$d_2 = 38$ mm. This is regarded as the 'cyclone diameter' and for many purposes can be anywhere within the range 10-100 mm, for example 15-60 mm; with excessively large $d_2$, the energy consumption becomes large to maintain effective separation while with too small $d_2$ unfavourable Reynolds Number effects and excessive shear stresses arise.

The cyclone separator can be in any orientation with insignificant effect.

The surface 11 is smooth as, in general irregularities upset the desired flow patterns, within the cyclone. For the best performance, all other internal surfaces of the cyclone should also be smooth. However, surface 11 need not be plane; it could be dished (converse or concave) or may have a small upstanding circular ridge concentric with the outlet 10 to assist the flow moving radially inward near the surface, and the outer 'fringe' of the vortex, to recirculate in a generally downstream direction for resorting. The outlet 10 is a cylindrical bore as shown, btt its minimum diameter $d_o$ could instead be approached by a smooth curve of the surface 11, and the outlet 10 could thereafter diverge. Where the minimum diameter is provided by an orifice plate lying flush on the surface 11 and containing a central hole of diameter $d_o$ leading directly to a relatively large bore, the different flow characteristics appear to have a slightly detrimental though not serious, effect on performance. The outlet 10 may advantageously be divergent in the direction of overflow, with the outlet widening thereafter at a cone half-angle of up to 10°. In this way, a smaller pressure drop is experienced along the outlet, which must be balanced against the tendency of the illustrated cylindrical bore (cone half angle of zero) to encourage coalescence of droplets of the ligher phase, according to the requirements of the user.

We claim:

1. A cyclone separator comprising at least a primary portion having generally the form of a volume of revolution and having a first end and a second end, the diameter at said second end being less than at said first end, a plurality of n axially staggered inlets, each inlet giving into an inwardly spiralling feed channel, where $n > 1$, each said inlet having at least a tangential component at or adjacent said first end for introduced feed to be separated into the cyclone separator and the separator further including at least two outlets, in which cyclone separator the following relationship applies:

where $d_i$ is the diameter of the said primary portion where flow enters (but neglecting any feed channel), $d_{ix}$ is twice the radius at which flow enters the cyclone through the $x^{th}$ inlet (i.e. twice the minimum distance of the tangential component of the inlet centre line from the axes) and $$d_i = \frac{1}{A_i} \sum_{x=1}^{x=n} d_{ix} A_{ix}$$

where $A_{ix}$ is the total cross sectional area of the $x^{th}$ inlet at entry to the cyclone separator in a plane parallel to the axis of the cyclone separator and perpendicular to the component of the inlet centre line not parallel to the cyclone axis, and where $$A_i = \sum_{x=1}^{x=n} A_{ix}$$

and where $d_2$ is the diameter of the primary portion at said second end and is measured at a point $z_2$ where the condition first applies that $$\tan^{-1}\left( \frac{d_2 - d}{2(z - z_2)} \right) < 2°$$

for all $z > z_2$ where z is the distance along the cyclone separator axis downstream of the plane containing the inlet and d is the diameter of the cyclone at z, and further $z=0$ being the axial position of the weighted areas of the inlets such that the injection of angular momentum into the cyclone separator is equally distributed axially about said axial position where $z=0$ and being defined by $$\frac{1}{A_i d_i} \sum_{x=1}^{x=n} z_x A_{ix} d_{ix} = 0$$

where $z_x$ is the axial position of the $x^{th}$ inlet, and further $$\frac{\pi d_2 d_i}{4 A_i}$$

is from 3 to 12.

2. A cyclone separator according to claim 1 wherein $$\frac{\pi d_2 d_i}{4 A_i}$$

is from 4 to 10.

3. A cyclone separator according to claim 1 wherein $$\frac{\pi d_2 d_i}{4 A_i}$$

is from 6 to 8.

4. A cyclone separator according to claim 1, further including a generally axially symmetrical secondary portion at said second end and substantially coaxial, with said primary portion and wherein $d/d_3 > 0.98$ for all $z > z_3$, where $d_3$ is the diameter of the end of the secondary portion remote from said primary portion.

5. A cyclone separator according to claim 4 further including a tertiary portion substantially coaxial with said secondary portion and at the end of said secondary portion remote from said primary portion.

6. A cyclone separator according to claim 4 wherein $20' < \alpha < 2°$ where $\alpha$ is the half angle of convergence of the secondary portion; i.e.

$$\alpha = \tan^{-1} \frac{d_2 - d_3}{2(z_3 - z_2)}.$$

7. A cyclone separator according to claim 6 wherein $\alpha$ is from 30' to 52'.

8. A cyclone separator according to claim 4 wherein $d_2 < 0.9 d_i$.

9. A cyclone separator according to claim 8 wherein $d_3 < 0.9 d_2$.

10. A cyclone separator according to claim 9 wherein $d_3/d_2$ is from 0.25 to 0.75.

11. A cyclone separator according to claim 1 wherein $d_2 < 0.9 d_i$.

12. A cyclone separator according to claim 4 wherein $d_3 < 0.9 d_2$.

13. A cyclone separator according to claim 1 wherein the inlet enters the cyclone with a component in the axial downstream direction.

14. A cyclone separator according to claim 1 wherein one of said outlets is an overflow outlet at said first end of first said primary portion.

15. A cyclone separator according to claim 14 wherein $d_o/d_2 < 0.2$ where $d_o$ is the diameter of said one of said outlets.

16. A cyclone separator according to claim 15 wherein $d_o/d_2$ is from 0.008 to 0.1.

17. A cyclone separator according to claim 1 characterized in that where said plurality of inlets are not axially staggered and/or do not include feed channels which are inwardly spiralling, at least part of the generator of the primary portion and/or of the secondary portion is curved.

* * * * *